(12) United States Patent
Williams

(10) Patent No.: US 10,035,325 B2
(45) Date of Patent: Jul. 31, 2018

(54) LEATHER CUSHION BACK COVERING MATERIAL FOR PLANAR SURFACES

(75) Inventor: Dale R. Williams, Greer, SC (US)

(73) Assignee: Milliken & Company, Spartanburg, SC (US)

(*) Notice: Subject to any disclaimer, the term of this patent is extended or adjusted under 35 U.S.C. 154(b) by 626 days.

(21) Appl. No.: 13/479,414

(22) Filed: May 24, 2012

(65) Prior Publication Data

US 2012/0315436 A1    Dec. 13, 2012

(51) Int. Cl.
| | |
|---|---|
| *B32B 5/02* | (2006.01) |
| *B32B 9/02* | (2006.01) |
| *B32B 9/04* | (2006.01) |
| *B32B 7/12* | (2006.01) |

(52) U.S. Cl.
CPC ............ *B32B 5/022* (2013.01); *B32B 7/12* (2013.01); *B32B 9/025* (2013.01); *B32B 9/047* (2013.01); *B32B 2307/50* (2013.01); *B32B 2419/04* (2013.01); *Y10T 428/24355* (2015.01); *Y10T 442/3707* (2015.04); *Y10T 442/494* (2015.04); *Y10T 442/659* (2015.04)

(58) Field of Classification Search
CPC ......... Y10T 428/24355; Y10T 442/494; Y10T 442/3707; Y10T 442/659; B32B 2307/50; B32B 5/022; B32B 7/12; B32B 9/025; B32B 9/047; B32B 2419/04

USPC .................. 428/141, 151; 442/268, 319, 381
See application file for complete search history.

(56) References Cited

U.S. PATENT DOCUMENTS

| | | | | |
|---|---|---|---|---|
| 4,341,581 | A | * | 7/1982 | Civardi et al. ............... 156/209 |
| 8,211,529 | B2 | * | 7/2012 | Schaefer ....................... 428/151 |
| 2007/0184742 | A1 | * | 8/2007 | Coulson et al. .............. 442/370 |
| 2007/0231547 | A1 | * | 10/2007 | Makimura et al. ........... 428/151 |
| 2009/0291250 | A1 | * | 11/2009 | Okada et al. ................... 428/91 |
| 2010/0086738 | A1 | * | 4/2010 | Tanaka et al. ................ 428/151 |
| 2012/0100351 | A1 | * | 4/2012 | Covelli et al. ................ 428/196 |

* cited by examiner

*Primary Examiner* — Nathan L Van Sell
(74) *Attorney, Agent, or Firm* — Brenda D. Wentz

(57) ABSTRACT

A planar surface covering with an outer leather layer, a stabilization layer secured to the outer leather layer by an adhesive, and a tension layer secured to the stabilization layer. The stabilization layer has a fibrous stabilization material with stabilization fibers oriented in at least two planar directions of the stabilization layer. The tension layer has a fibrous tension material with tension fibers oriented in at least two planar directions of the tension layer. The tension fibers melt at a lower temperature than the stabilization fibers, and the adhesive melts at a lower temperature than the tension fibers. In one version, the fibrous stabilization material of the stabilization layer has a thickness and fiber characteristics that create cushion attributes in the stabilization layer. In another version, the fibrous tension material of the tension layer has a thickness and fiber characteristics that create cushion attributes in the tension layer.

18 Claims, 1 Drawing Sheet

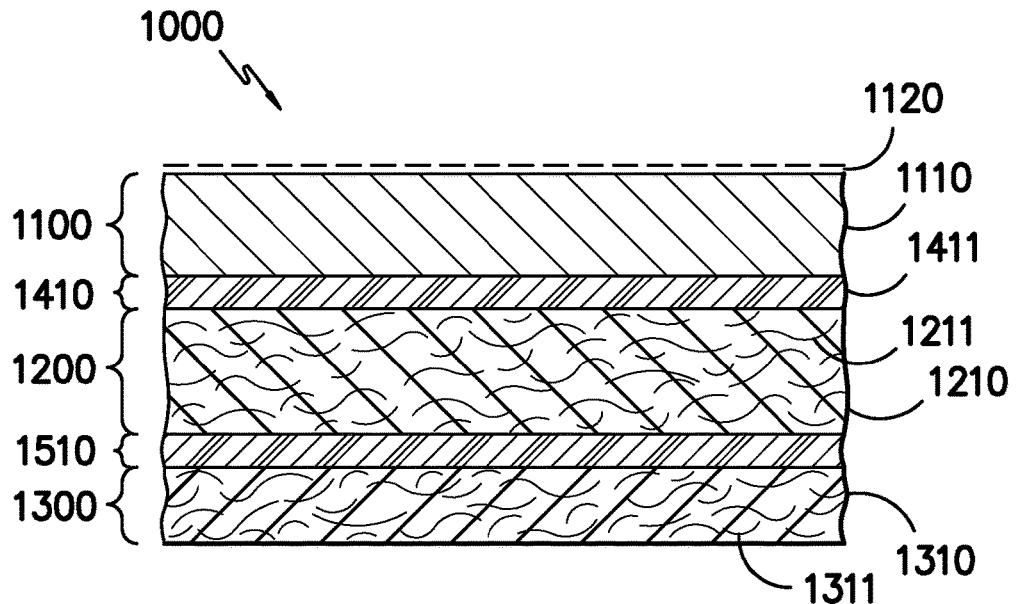
FIG. -1-
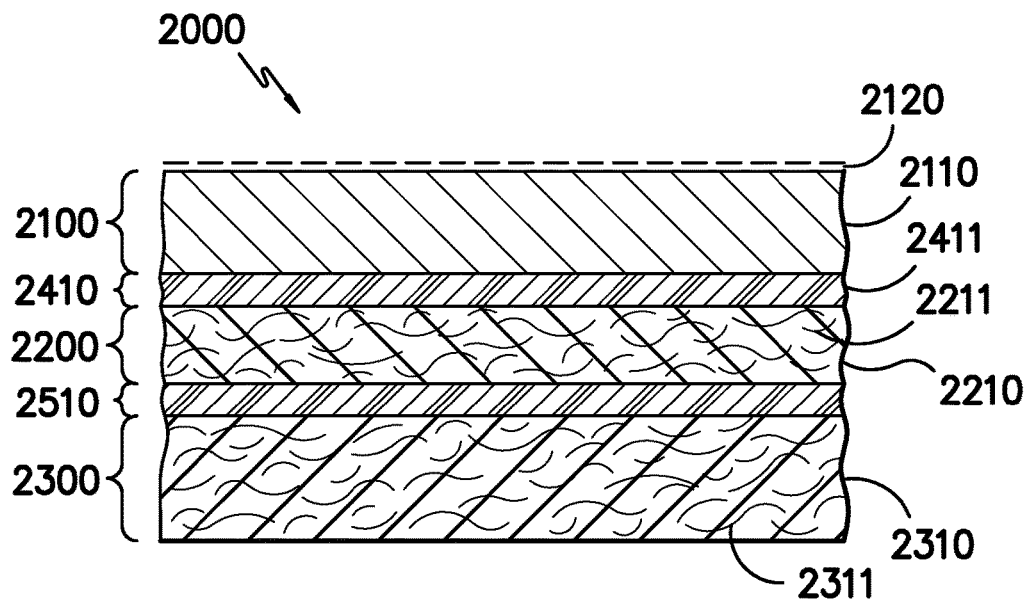
FIG. -2-

LEATHER CUSHION BACK COVERING MATERIAL FOR PLANAR SURFACES

CROSS REFERENCE TO RELATED APPLICATIONS

This application claims priority to U.S. Provisional Patent Application Number 61/495,721, entitled "Leather Cushion Back Covering Material For Planar Surfaces," which was filed on Jun. 10, 2011, and is entirely incorporated by reference herein.

BACKGROUND

The present invention generally relates to field of providing cushion back materials for covering planar surfaces, and more particularly to, using leather as an outer surface of a cushion backed material for covering planar surfaces.

BRIEF DESCRIPTION OF THE DRAWINGS

FIG. 1 shows an enlarged cross sectional view of an embodiment of the present invention having an outer leather layer secured to a stabilizing layer by an adhesive layer, and a tensioning layer secured to the stabilizing layer, this embodiment illustrating the stabilizing layer also a cushioning layer.

FIG. 2 shows an enlarged cross sectional view of another embodiment of the present invention having an outer leather layer secured to a stabilizing layer by an adhesive layer, and a tensioning layer secured to the stabilizing layer, this embodiment illustrating the tension layer also a cushioning layer.

DETAILED DESCRIPTION

Referring now to FIGS. 1 and 2, there is shown an embodiment of the present invention illustrated as a leather cushion back covering material 1000, 2000, for planar surfaces. The leather cushion back covering material 1000, 2000, generally comprises an outer leather layer 1100, 2100, a stabilization layer 1200, 2200, secured to the outer leather layer 1100, 2100, by a first adhesive layer 1410, 2410, and a tension layer 1300, 2300, secured to the opposite side of the stabilization layer 1200, 2200, from the outer leather layer 1100, 2100. The leather cushioned back covering material 1000, 2000, can also include a second adhesive layer 1510, 2510 securing the tension layer 1300, 2300, to the stabilization layer 1200, 2200.

Still referring to FIGS. 1 and 2, the outer leather layer 1100, 2100, has a leather surface material 1110, 2110, that is exposed to the exterior of the leather cushion back covering material 1000, 2000. The leather surface material 1110, 2110, can be formed of hide leather, composite leather, or faux leather. Composite leather typically is formed from leather particles held together with a binder. In one preferred embodiment, the outer surface of the leather surface material has a texture, such as embossing, to provide additional friction for the exterior surface of the leather cushion back covering material 1000, 2000. In one embodiment the outer leather layer 1100, 2100, also includes a protective coating 1120, 2120, on the exposed surface of the leather surface material 1110, 2110, that provides a wear resistance for the leather surface material 1110, 2110. The protective coating 1120, 2120, can comprise polyurethane, thermoplastic ionomer resins, polytetrafluoroethylene, or the like.

Referring still to FIGS. 1 and 2, the stabilization layer 1200, 2200, has greater planar dimensional stability than the outer leather layer 1100, 2100 under differing heat and humidity conditions. In one embodiment, the stabilization layer 1200, 2200, comprises a fibrous stabilization material 1210, 2210, having stabilizing fibers 1211, 2211. In one preferred embodiment the stabilizing fibers 1211, 2211, of the fibrous stabilization material 1210, 2210, are oriented in at least two planar directions of the stabilization layer 1200, 2200, in order to provide dimensional stability for the stabilization layer 1200, 2200, in the planar direction. The fibrous stabilization material 1210, 2210, can have a construction of woven, knitted, airlaid nonwoven, needle punched nonwoven, stitch bonded, and the like. Stabilizing fibers 1211, 2211, in a fibrous stabilization material 1210, 2210, have a stabilizing fiber melt temperature.

Still referring to FIGS. 1 and 2, the tension layer 1300, 2300, has a characteristic that allows it to shrink dimensionally and uniformly in the planar directions of the leather cushion back covering material 1000, 2000. Typically, this characteristic is created because the tension layer 1300, 2300, has a lower melting or deformation temperature than the stabilization layer 1200, 2200. In one embodiment, the characteristics of the tension layer 1300, 2300, are achieved by using a fibrous tension material 1310, 2310, with tension fibers 1311, 2311, having a tension fiber melt temperature below the stabilizing fiber melt temperature of the stabilizing fibers 1211, 2211, in the fibrous stabilization material 1210, 2210, of the stabilization layer 1200, 2200. In one preferred embodiment, the tension fibers 1311, 2311, have a tension fiber melt temperature that is at least 30 degrees F. below the stabilizing fiber melt temperature of the stabilizing fibers 1211, 2211, in the fibrous stabilization material 1210, 2210. The tension fibers 1311, 2311, of the fibrous tension material 1310, 2310, are oriented in at least two planar directions of the tension layer 1300, 2300, in order to provide dimensional stability for the tension layer 1300, 2300, in the planar direction.

Referring still to FIGS. 1 and 2, the first adhesive layer 1410, 2410, secures the outer leather surface layer 1100, 2100, to the stabilization layer 1200, 2200. In a preferred embodiment, the first adhesive layer 1410, 2410, is formed of a first adhesive 1411, 2411 with a first adhesive melt temperature that is below the tension fiber melt temperature of the tension fibers 1311, 2311, in the tension layer 1300, 2300. In an additional preferred embodiment, the first adhesive melt temperature of the first adhesive 1411, 2411, is at least 30 degrees F. lower than the tension fiber melt temperature of the tension fibers 1311, 2311. The fibrous tension material 1310, 2310, can have a construction of woven, knitted, airlayed nonwoven, needle punched nonwoven, stitch bonded, and the like.

Still referring to FIGS. 1 and 2, the stabilization layer 1200, 2200, is secured to the tension layer 1300, 2300, by needle punch, stitch bond, adhesives, or the like. When adhesives are used to secure the stabilization layer 1200, 2200, to the tension layer 1300, 2300, the adhesive preferably has a melt temperature above the tension fiber melt temperature of the tension fibers 1311, 2311, in the fibrous stabilization material 1210, 2210, and more preferably at least 30° F. higher than the tension fiber melt temperature.

As used with the present invention, a layer is a cushioning layer if it has resilience where a deflection of at least 10% of the height of the material will return to its original height without a noticeable permanent deformation, and the at least 10% resilient deflection is at least 0.05 inches. In a preferred embodiment, the cushioning layer will have a resilient deflection of at least thirty percent (30%) of the height of the materiel that will return to its original height without a noticeable permanent deformation, and the at least thirty percent (30%) resilient deflection is at least 0.05 inches. As a result of the cushioning layer, the leather cushion back covering material 1000, 2000, will have a total cushioning value of no more than 240 gravities using the impact attenuation test in ASTM F1702-10. A total cushioning effect of this value is similar to a standard carpet tile with nylon yarn tufted loop construction face, glass stabilization layer, polyurethane cushion, and a hot melt tie coat. As illustrated in FIG. 1, the stabilization material 1210 in the stabilization layer 1200 is a cushioning layer within the leather cushion back covering material 1000. As illustrated in FIG. 2, the tension material 2310 in the tension layer 2300 is also a cushioning layer within the leather cushion back covering material 2000.

In one method of making the leather cushion back covering material 1000, 2000, of the present invention, the stabilization layer 1200, 2200, and the tension layer 1300, 2300, are secured together, such as by adhesive, needle punching, stitch bonding, heat, or other means. The adhesive layer 1410, 2410, is applied to the stabilization layer 1200, 2200, of the combined stabilization tension layer. Processes for applying the adhesive layer 1410, 2410, include hot melt roller coating, hot knife coating, extrusion coating, powder coating, or the like. Following the application of the adhesive layer 1410, 2410, to the stabilization layer 1200, 2200, the combined tension layer 1300, 2300, stabilization layer 1200, 2200, and adhesive layer 1410, 2410, are placed on the bottom belt of a belt laminating press, or double belt compression oven, with the adhesive layer 1410, 2410, facing upward. The outer leather layer 1100, 2100, is then placed on the adhesive layer 1410, 2410, with the embossed surface facing away from the adhesive layer 1410, 2410. After combining, the layers of the leather cushion back covering material 1000, 2000, pass through a fixed gap in the belt laminating press and heated to a temperature that melts the adhesive layer 1410, 2410. The temperature of the belt laminating press will also be raise sufficient enough that the tension layer 1300, 2300, will shrink, but that the that the stabilization layer 1200, 2200, will not shrink more than the tension layer 1300, 2300. Once the layers of the leather cushion back covering material 1000, 2000, reach the desired temperature, the assembly is cooled at the same fixed gap to a temperature below the melting temperatures of the various layers in the leather cushion back covering material 1000, 2000. Following cooling and removal from the belt laminating press, the leather cushion back covering material 1000, 2000, is cut to the desired shape, such as a tile for flooring applications.

The melting of the adhesive layer 1410, 2410, and the shrinking of the tension layer 1300, 2300, cause the leather cushion back covering material 1000, 2000, to have a cupping. Cupping is defined as the tendency of the center of the outer leather layer 1100, 2100, to lift from a planar surface when the leather cushion back covering material 1000, 2000, is placed on the planar surface with the outer leather layer 1100, 2100, disposed the furthest away from the planar surface. A small amount of cupping is considered desirable for uses such as flooring, where otherwise the outer edges of a tile will have a tendency to lift away from the planar floor, that is, curl.

In one example, the leather cushion back covering material was formed with an outer leather layer of composite leather with eighty five percent (85%) leather and fifteen percent (15%) binder. The composite leather was about 0.125 inches thick and has a weight of about 90 oz/yd$^2$. The composite leather had an embossed outer surface with a polyurethane protective coating. A polyolefin adhesive, with a melt temperature of about 240° F. and about fifty four percent (54%) by weight of a flyash filler, secured the outer leather layer to the stabilization layer. The stabilization layer was an airlaid and needle punched nonwoven of nylon 6, 6, fibers and had a thickness of about 0.185 inches and a weight of about 20 oz/yd$^2$. The construction, thickness, and weight of the stabilization layer also created a cushioning layer. The stabilization layer was secured to the tension layer with an adhesive. The tension layer was a needle punched nonwoven of polyester fibers, and had a thickness of about 0.02 inches and a weight of about 4 oz/yd$^2$. To form the leather cushion back covering material, the layers were compressed to a fixed gap of 0.37 inches and heated to a temperature of about 340° F. The layers were cooled below the melt temperatures of the materials in the leather cushion back covering material while being held to the same gap, and then released from the compression.

In another example, the leather cushion back covering material was formed with an outer leather layer of composite leather with eighty five percent (85%) leather and fifteen percent (15%) binder. The composite leather was about 0.125 inches thick and has a weight of about 90 oz/yd$^2$. The composite leather had an embossed outer surface with a polyurethane protective coating. A polyolefin adhesive, with a melt temperature of about 240° F. and about fifty four percent (54%) by weight of a flyash filler, secured the outer leather layer to the stabilization layer. The stabilization layer was an airlaid and needle punched nonwoven of nylon 6, 6, fibers and had a thickness of about 0.065 inches and a weight of about 12 oz/yd$^2$. The stabilization layer was secured to the tension layer with an adhesive. The tension layer was an airlaid and needle punched nonwoven of polyester fibers, and had a thickness of about 0.175 inches and a weight of about 18 oz/yd$^2$. The construction, thickness, and weight of the tension layer also created a cushioning layer. To form the leather cushion back covering material, the layers were compressed to a fixed gap of 0.37 inches and heated to a temperature of about 340° F. The layers were cooled below the melt temperatures of the materials in the leather cushion back covering material while being held to the same gap, and then released from the compression.

While the invention has been described in detail with reference to specific embodiments thereof, it will be apparent to one skilled in the art that various changes and modifications can be made, and equivalents employed, without departing from the scope of the appended claims.

What is claimed is:

1. A leather cushion back covering material for a planar surface, comprising:
   an outer leather layer, wherein the outer leather layer is comprised of hide leather, composite leather, or faux leather;
   a stabilization layer having stabilization fibers with a stabilization fiber melting temperature, wherein the stabilization layer has a resilience where a deflection of at least ten percent (10%) of the height of the stabilization layer will return to its original height without permanent deformation and the ten percent (10%) deflection will be at least 0.05 inches;
   a tension layer of nonwoven material having tension fibers with a tension fiber melting temperature, the tension fiber melting temperature being lower than the stabilization fiber melting temperature of the stabilization fibers, and wherein the tension layer shrinks dimensionally and uniformly in the planar directions of the leather cushion back covering material, said dimensional and uniform shrinking resulting in cupping of the leather cushion back covering material; and, a first adhesive layer having an adhesive with an adhesive melt temperature below the tension fiber melting temperature of the tension fibers; and, wherein the outer leather layer is secured to the stabilization layer with the first adhesive layer and the tension layer is secured to the stabilization layer on the opposite side of the outer leather layer.

2. The leather cushion back covering material of claim 1, wherein the tension layer is secured to the stabilization layer with a second adhesive layer.

3. The leather cushion back covering material of claim 1, wherein the outer leather layer has a textured outer surface.

4. The leather cushion back covering material of claim 3, wherein the textured outer surface is achieved by embossing.

5. The leather cushion back covering material of claim 1, wherein the outer leather layer further includes a protective coating.

6. The leather cushion back covering material of claim 5, wherein the protective coating is selected from the group consisting of polyurethane, thermoplastic ionomer resins, and polytetrafluoroethylene.

7. The leather cushion back covering material of claim 1, wherein the stabilization fibers of the stabilization layer are oriented in at least two planar directions.

8. The leather cushion back covering material of claim 1, wherein the stabilization layer is woven, knitted, airlaid nonwoven, needle punch nonwoven, or stitch bonded.

9. The leather cushion back covering material of claim 1, wherein the tension fibers of the tension layer have a fiber melt temperature that is at least 30 degrees F. below the melt temperature of the stabilization fibers comprising the stabilization layer.

10. A leather cushion back covering material for a planar surface, comprising:

an outer leather layer, wherein the outer leather layer is comprised of hide leather, composite leather, or faux leather;

a stabilization layer having stabilization fibers with a stabilization fiber melting temperature;

a tension layer of nonwoven material having tension fibers with a tension fiber melting temperature, the tension fiber melting temperature being lower than the stabilization fiber melting temperature of the stabilization fibers, wherein the tension layer shrinks dimensionally and uniformly in the planar directions of the leather cushion back covering material, said dimensional and uniform shrinking resulting in cupping of the leather cushion back covering material, and wherein the tension layer has a resilience where a deflection of at least ten percent (10%) of the height of the tension layer will return to its original height without permanent deformation and the ten percent (10%) deflection will be at least 0.05 inches; and, a first adhesive layer having an adhesive with an adhesive melt temperature below the tension fiber melting temperature of the tension fibers; and, wherein the outer leather layer is secured to the stabilization layer with the first adhesive layer and the tension layer is secured to the stabilization layer on the opposite side of the outer Feather layer.

11. The leather cushion back covering material of claim 10, wherein the tension layer is secured to the stabilization layer with a second adhesive layer.

12. The leather cushion back covering material of claim 10, wherein the outer leather layer has a textured outer surface.

13. The leather cushion back covering material of claim 12, wherein the textured outer surface is achieved by embossing.

14. The leather cushion back covering material of claim 10, wherein the outer leather layer further includes a protective coating.

15. The leather cushion back covering material of claim 14, wherein the protective coating is selected from the group consisting of polyurethane, thermoplastic ionomer resins, and polytetrafluoroethylene.

16. The leather cushion back covering material of claim 10, wherein the stabilization fibers of the stabilization layer are oriented in at least two planar directions.

17. The leather cushion back covering material of claim 10, wherein the stabilization layer is woven, knitted, airlaid nonwoven, needle punch nonwoven, or stitch bonded.

18. The leather cushion back covering material of claim 10, wherein the tension fibers of the tension layer have a fiber melt temperature that is at least 30 degrees F. below the melt temperature of the stabilization fibers comprising the stabilization layer.

* * * * *

UNITED STATES PATENT AND TRADEMARK OFFICE
CERTIFICATE OF CORRECTION

Page 1 of 1

PATENT NO. : 10,035,325 B2
APPLICATION NO. : 13/479414
DATED : July 31, 2018
INVENTOR(S) : Dale R. Williams It is certified that error appears in the above-identified patent and that said Letters Patent is hereby corrected as shown below:

In the Claims

In Column 6, Line 18, Claim 10 delete the word "Feather" and replace with the word "leather".

Signed and Sealed this
Twenty-eighth Day of May, 2019

Andrei Iancu
*Director of the United States Patent and Trademark Office*